United States Patent
Feiszli et al.

(10) Patent No.: US 10,168,899 B1
(45) Date of Patent: Jan. 1, 2019

(54) COMPUTER-READABLE MEDIA AND RELATED METHODS FOR PROCESSING HAND-DRAWN IMAGE ELEMENTS

(71) Applicant: FiftyThree, Inc., New York, NY (US)

(72) Inventors: Matthew Feiszli, New York, NY (US); Peter Sibley, New York, NY (US); Denis Kovacs, New York, NY (US); Amit Pitaru, New York, NY (US)

(73) Assignee: FIFTYTHREE, INC., New York, NY (US)

(*) Notice: Subject to any disclaimer, the term of this patent is extended or adjusted under 35 U.S.C. 154(b) by 472 days.

(21) Appl. No.: 15/072,103

(22) Filed: Mar. 16, 2016

Related U.S. Application Data

(60) Provisional application No. 62/308,849, filed on Mar. 15, 2016, provisional application No. 62/133,988, filed on Mar. 16, 2015.

(51) Int. Cl.
   *G06F 3/0488* (2013.01)
   *G06F 3/0484* (2013.01)

(52) U.S. Cl.
   CPC ........ *G06F 3/04883* (2013.01); *G06F 3/0484* (2013.01)

(58) Field of Classification Search
   CPC .................................................. G06F 3/04883
   USPC ........................................................ 715/863
   See application file for complete search history.

(56) References Cited

U.S. PATENT DOCUMENTS

| | | | | |
|---|---|---|---|---|
| 6,373,490 B1* | 4/2002 | Bendiksen | ............ | G06T 11/001 345/441 |
| 6,515,659 B1* | 2/2003 | Kaye | ....................... | G06T 17/20 345/419 |
| 6,587,587 B2* | 7/2003 | Altman | .............. | G06K 9/00442 345/179 |
| 6,747,643 B2* | 6/2004 | Happel | .................. | G06K 9/481 345/419 |

(Continued)

OTHER PUBLICATIONS

Non-Final Office Action for U.S. Appl. No. 13/850,103, filed Mar. 25, 2013, and mailed from the USPTO dated Jan. 11, 2016, 24 pgs.

(Continued)

*Primary Examiner* — Reza Nabi
(74) *Attorney, Agent, or Firm* — Stoel Rives, LLP; John R. Thompson

(57) ABSTRACT

Computer-readable media and related methods for processing hand-drawn image elements are disclosed. A method includes selecting an image element model to replace an image element derived from a hand-drawn user input, correcting the selected image element model, and displaying the corrected image element model on an electronic display. A computer-readable medium includes computer-readable instructions stored thereon. The computer-readable instructions are configured to instruct a processor to determine whether an image element model is a suitable replacement for a hand-drawn image element, perform correction on the image element model if it is determined that the image element model is a suitable replacement, display the corrected image element model if it is determined that the image element model is a suitable replacement, and display the hand-drawn image element model if it is determined that the image element model is not a suitable replacement.

5 Claims, 11 Drawing Sheets

(56) References Cited

U.S. PATENT DOCUMENTS

| | | | | |
|---|---|---|---|---|
| 7,079,153 | B2* | 7/2006 | Derry | G06F 9/451 |
| | | | | 345/594 |
| 7,324,691 | B2* | 1/2008 | Li | G06K 9/00476 |
| | | | | 382/181 |
| 8,605,095 | B2* | 12/2013 | DiVerdi | G06T 11/001 |
| | | | | 345/441 |
| 9,317,125 | B2* | 4/2016 | Smolinski | G06K 9/00335 |
| 9,529,486 | B2* | 12/2016 | Petschnigg | G06F 3/048 |
| 9,613,264 | B2* | 4/2017 | Kolmykov-Zotov | |
| | | | | G06K 9/00409 |
| 9,721,362 | B2* | 8/2017 | Smolinski | G06T 11/203 |
| 2006/0126936 | A1* | 6/2006 | Bhaskarabhatla | G06K 9/222 |
| | | | | 382/187 |
| 2007/0115287 | A1* | 5/2007 | Sander | G06T 11/20 |
| | | | | 345/441 |
| 2007/0154094 | A1* | 7/2007 | Lin | G06K 9/00416 |
| | | | | 382/187 |
| 2007/0206008 | A1* | 9/2007 | Kaufman | G06T 15/06 |
| | | | | 345/424 |
| 2008/0018650 | A1* | 1/2008 | Sander | G06T 15/40 |
| | | | | 345/441 |
| 2008/0266309 | A1* | 10/2008 | Sander | G06T 11/001 |
| | | | | 345/582 |
| 2008/0294406 | A1* | 11/2008 | Hachmeister | G06N 3/004 |
| | | | | 703/11 |
| 2009/0324076 | A1* | 12/2009 | Kolmykov-Zotov | |
| | | | | G06K 9/00409 |
| | | | | 382/170 |
| 2010/0182328 | A1* | 7/2010 | Pirchio | G06T 11/203 |
| | | | | 345/474 |
| 2010/0201692 | A1* | 8/2010 | Niles | G06T 13/20 |
| | | | | 345/473 |
| 2013/0135191 | A1* | 5/2013 | Shiokawa | G06F 3/017 |
| | | | | 345/156 |
| 2013/0229390 | A1* | 9/2013 | DiVerdi | G06F 3/0488 |
| | | | | 345/179 |
| 2013/0263027 | A1* | 10/2013 | Petschnigg | G06F 3/048 |
| | | | | 715/761 |
| 2015/0029162 | A1* | 1/2015 | Harris | G06F 3/0488 |
| | | | | 345/179 |
| 2016/0371250 | A1* | 12/2016 | Rhodes | G06F 17/276 |

OTHER PUBLICATIONS

Notice of Allowability for U.S. Appl. No. 13/850,103, filed Mar. 25, 2013, and mailed from the USPTO dated Aug. 29, 2016, 4 pgs.

Notice of Allowance and Fee(s) Due for U.S. Appl. No. 13/850,103, filed Mar. 25, 2013, and mailed from the USPTO dated Aug. 22, 2016, 5 pgs.

International Search Report and Written Opinion for Application No. PCT/US13/34082 filed Mar. 27, 2013, and mailed from the International Searching Authority dated Jul. 10, 2013, 10 pgs.

Non-Final Office Action for U.S. Appl. No. 15/353,363, filed Nov. 16, 2016, and mailed from the USPTO dated Apr. 4, 2017, 22 pgs.

International Preliminary Report on Patentability for International Application No. PCT/US2013/034082 filed Mar. 27, 2013, and mailed from the International Bureau dated Oct. 9, 2014, 9 pgs.

Petschnigg, et al., Office Action dated Nov. 30, 2017 for U.S. Appl. No. 15/353,363.

* cited by examiner

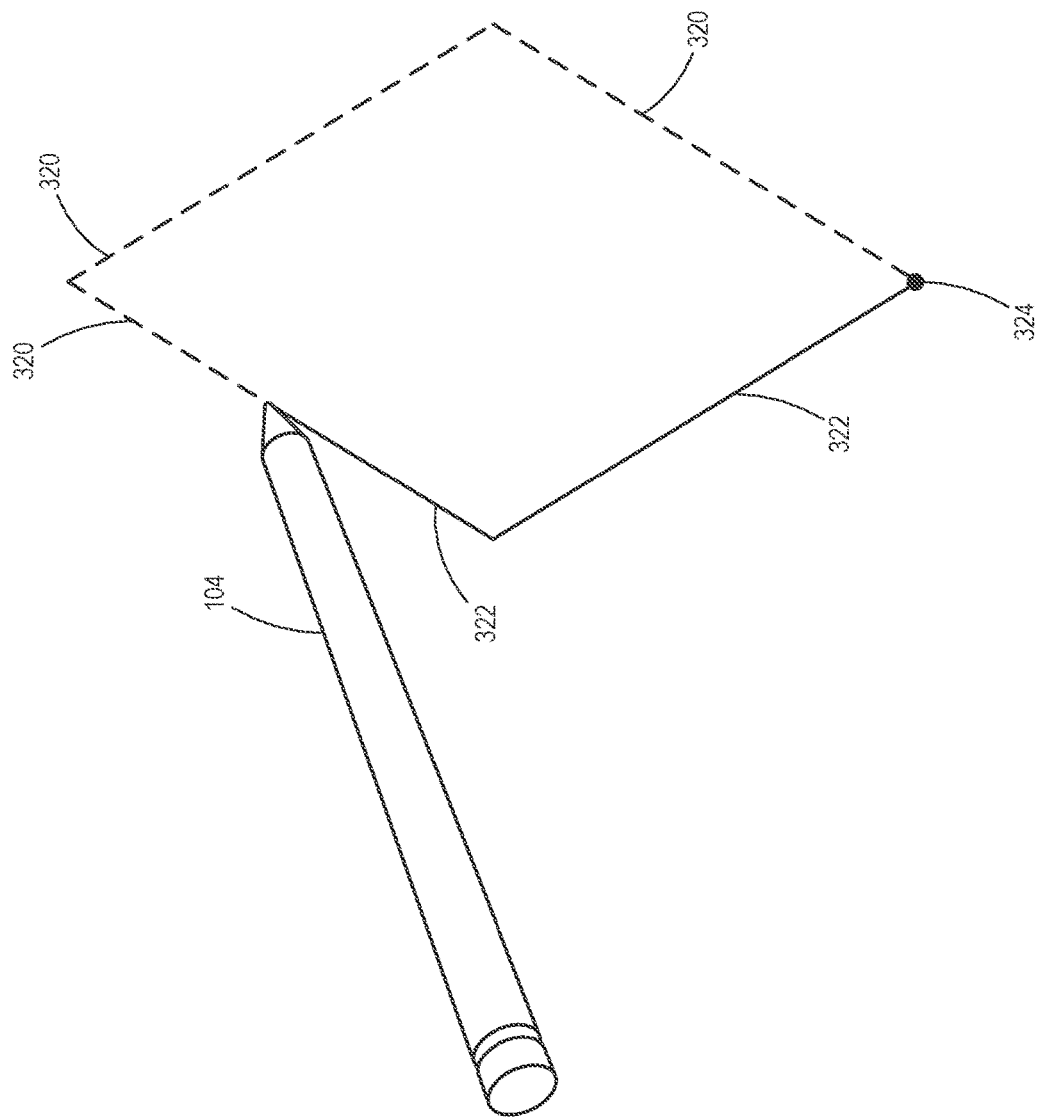

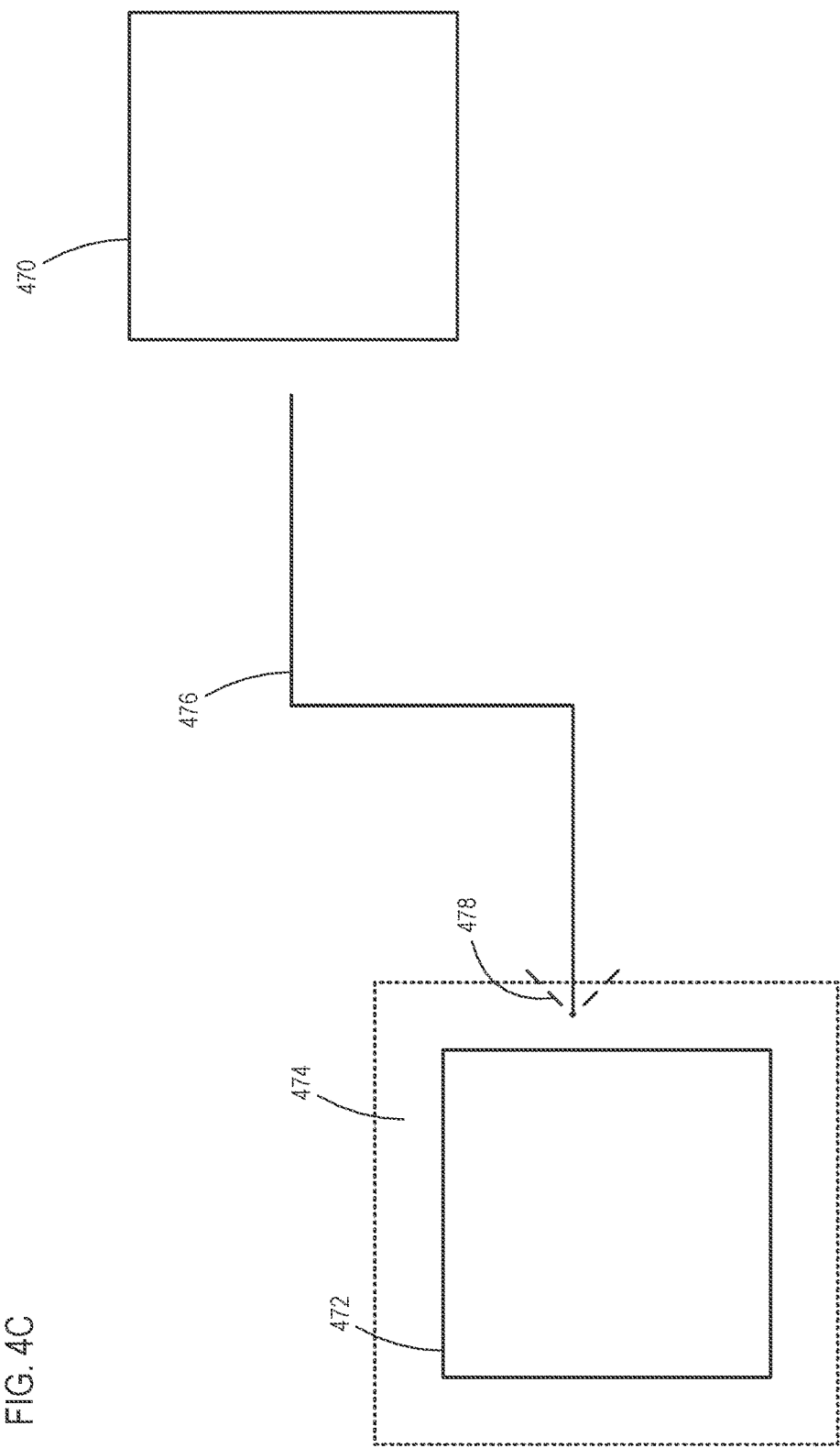

FIG. 6

Recognition Matrix 600

| Speed | Shapes | Lines | Angle to Canvas | Starting Angle | Ink | Guidelines | Corner Style | Rendering |
|---|---|---|---|---|---|---|---|---|
| Super Fast | ●▲■ | OR | 90° | 90° | 4px | Hide | None | |
| Flow Fast | ●▲■▼ | OR | 90° 60° 45° 30° | 90° 60° 45° 30° | 5px | Show | Lock to 1st Corner Style | Offline and Corner OR Online and Corner |
| Slow & Deliberate | Any Shape | AND | Any Angle | Any Angle | 4px | Show | Free | |

COMPUTER-READABLE MEDIA AND RELATED METHODS FOR PROCESSING HAND-DRAWN IMAGE ELEMENTS

PRIORITY CLAIM

This application claims priority to U.S. Provisional Application 62/133,988 filed Mar. 16, 2015, and U.S. Provisional Application 62/308,849 filed Mar. 15, 2016, the entire disclosure of each of which is hereby incorporated herein by reference.

TECHNICAL FIELD

The present disclosure relates to computer-readable media and related methods for processing hand-drawn image elements.

BRIEF DESCRIPTION OF THE DRAWINGS

FIG. 3B is a simplified view illustrating suggestion lines provided as a shape suggestion by the shape modifier of the computing device of FIG. 2.

FIG. 4C is a simplified view illustrating a corrected connector connecting a shape to another shape, according to some embodiments.

FIG. 6 is a chart illustrating an example embodiment of vocabularies of models for different levels of identified deliberateness in user input, according to some embodiments.

DETAILED DESCRIPTION OF PREFERRED EMBODIMENTS

Figure 1:
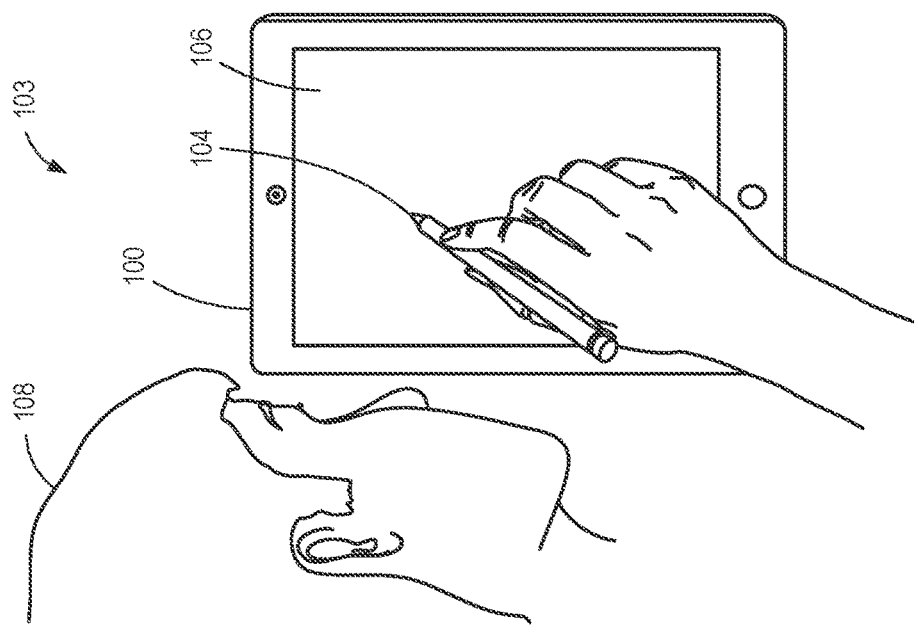
FIG. 1 is a simplified illustration of a computing device in two scenarios, according to some embodiments.
Figure 1:
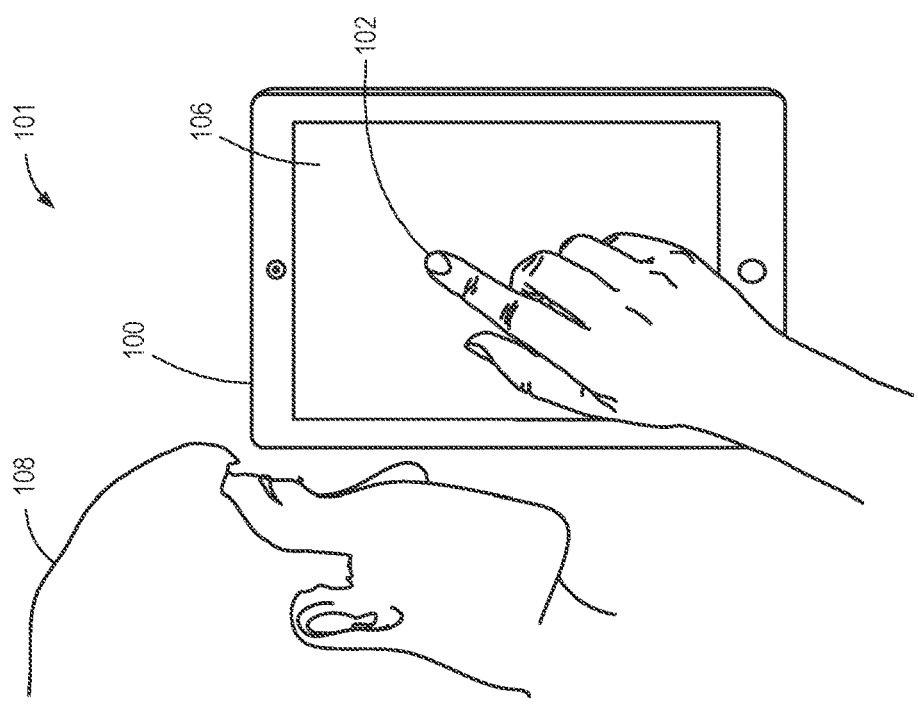

Creating documents, including images (e.g., flow diagrams, presentation slide decks, charts, graphs, hand drawings, other images, or combinations thereof) on a computing device (e.g., a tablet, a laptop, a smartphone, etc.), is a common task across many domains. Conventional software packages typically employ separate tools (e.g., mode changes) to create each type of image element (e.g., squares, circles, connection lines, text, etc.) separately, making the entire process relatively slow and laborious (e.g., work flow heavy) as a user navigates between different cumbersome tools (e.g., a rectangle drawing tool, a circle drawing tool, a line drawing tool, a connector drawing tool, etc.). Accordingly, there is a need for systems and methods that provide for relatively fast creation of image elements within documents with a single tool capable of producing multiple different image elements. For example, there is a need for systems and methods that provide for relatively fast creation of sketches containing a mixture of freehand strokes (e.g., handwritten text, drawings, etc.) and shapes (e.g., squares, circles, triangles, polygons, ellipses, polylines, etc.) from a user's drawn input.

Disclosed in some embodiments herein is a method of operating a computing device. The method includes comparing an image element derived from a hand-drawn user input to image element models stored in one or more data storage devices. The method also includes selecting one of the image element models to replace the image element if the selected one of the image element models matches the image element according to a set of rules stored in the one or more data storage devices. The method further includes correcting the selected one of the image element models to improve an aesthetic appearance of the selected one of the image element models, according to the set of rules. The method also includes displaying the corrected image element model on an electronic display of the computing device.

Disclosed in some embodiments herein is a computer-readable medium including computer-readable instructions stored thereon. The computer-readable instructions are configured to instruct a processor to determine whether an image element model from a plurality of image element models is a suitable replacement for the hand-drawn image element. The computer-readable instructions are also configured to instruct the processor to perform correction on the image element model if it is determined that the image element model is a suitable replacement. The computer-readable instructions are further configured to control a display to display the corrected image element model if it is determined that the image element model is a suitable replacement, and control the display to display the hand-drawn image element if it is determined that the image element model is not a suitable replacement.

Disclosed in some embodiments herein is a method for correcting user sketches. The method includes receiving measurements of user inputs, wherein the user inputs are indicative of objects to be drawn. The method also includes calculating based on the user inputs indicative of the objects to be drawn a degree of correction to apply to the user inputs. The method further includes calculating corrections to the objects based on the user inputs and the degree of correction to apply, and displaying corrected objects.

FIG. 1 is a simplified illustration of a computing device 100 in two scenarios 101, 103, according to some embodiments. The computing device 100 includes a touchscreen 106 configured to receive touch inputs. By way of non-limiting example, in scenario 101, a user 108 uses a finger 102 to apply the touch inputs to the touchscreen 106. Also by way of non-limiting example, in scenario 103, the user 108 uses a stylus 104 to apply the touch inputs to the touchscreen 106. It is also contemplated within the scope of the disclosure that other input devices may be used, such as a pointing device (e.g., a mouse, a trackpad, etc.), with or without a touchscreen. Also, in the scenarios 101, 103 illustrated in FIG. 1, the computing device 100 is illustrated as a tablet computer. The disclosure is not so limiting, however. For example, the computing device 100 may include a laptop computer, a smartphone, a personal digital assistant, or any other computing device including a touchscreen 106.

The computing device 100 may be programmed (e.g., with application software configured to operate in an operating system environment) to enable the user 108 to create different types of image elements within an electronic document executed by the computing device 100 by simply drawing the image elements without cycling through different tools. For example, the computing device 100 may be programmed to automatically determine whether the user 108 intended an input image element to be modified with image element models preprogrammed into the computing device 100 or whether the user 108 intended the input image element to be left unmodified as drawn in freehand. If the computing device 100 determines that the intent of the user 108 is to modify an image element inputted by the user 108, the computing device 100 may automatically replace the image element with the modified image element. If, on the other hand, the computing device 100 determines that the intent of the user 108 was to leave the image element unmodified, the computing device 100 may leave the user input unmodified (e.g., like freehand ink), leaving the image element as drawn by the user 108. As a result, the user 108 may add, to the electronic document, shapes that are automatically replaced with modified (e.g., improved) versions of the shapes, connection lines, text and labels, and other image elements without specifically identifying each image element through cumbersome menu selections, by simply drawing on the touchscreen 106.

Figure 2:
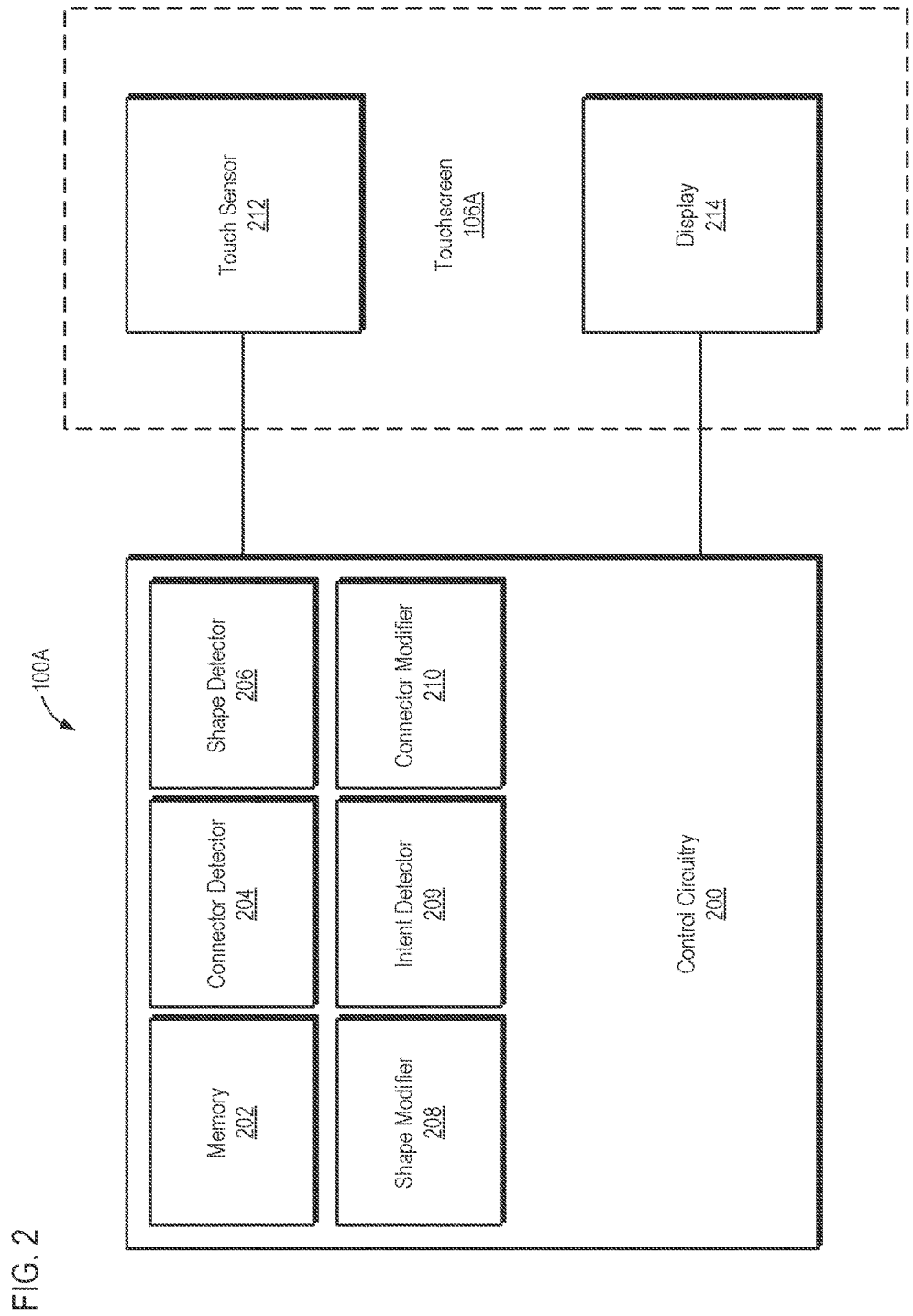
FIG. 2 is an example of a simplified block diagram of an example computing device, according to some embodiments.

FIG. 2 is an example of a simplified block diagram of an example computing device 100A of the computing device 100 of FIG. 1. The computing device 100A includes a control circuitry 200 operably coupled to a touchscreen 106A. The touchscreen 106A includes a touch sensor 212 (e.g., a capacitive sensor) and a display 214. The touch sensor 212 is configured to receive touch inputs from the user 108 (FIG. 1) (e.g., from the finger 102 of the user 108, from the stylus 104 manipulated by the user 108, etc.). The display 214 is configured to display a graphical user interface. By way of non-limiting example, the graphical user interface may be configured to include a drawing interface (e.g., including an electronic document) configured to display image elements drawn by the user 108 (FIG. 1), modified image elements replacing image elements drawn by the user 108, and combinations thereof.

The control circuitry 200 is configured to receive input information indicating the touch inputs received by the touch sensor 212, process the input information, control the display 214 to display the graphical user interface, and/or perform various other functions. In some embodiments, these functions may be implemented in machine-executable instructions to be executed by the control circuitry 200. By way of non-limiting example, the control circuitry 200 may include a computer system including one or more general-purpose or special-purpose computers (or other electronic devices). Also by way of non-limiting example, the control circuitry 200 may include a computer system including hardware components including specific logic for performing the functions the control circuitry 200 is configured to perform. As another non-limiting example, the control circuitry 200 may include a combination of hardware, software, and/or firmware.

In some embodiments, the functions the control circuitry 200 is configured to perform may be implemented as a computer program product including a computer-readable medium having stored thereon computer-readable instructions that may be used to program the control circuitry 200 or other electronic devices to implement embodiments described herein. The computer-readable medium may include, but is not limited to, hard drives, floppy diskettes, optical disks, CD ROMs, DVD ROMs, ROMs, RAMs, EPROMs, EEPROMs, magnetic or optical cards, solid-state memory devices, other types of media/computer-readable media (e.g., non-transitory computer-readable media) suitable for storing electronic instructions, or combinations thereof.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system (e.g., the computing device 100A) may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" and/or wireless protocols known to those of skill in the art. The network may encompass smaller networks and/or be connectable to other networks through a gateway or similar mechanism.

Each computer system (e.g., the computing device 100A) includes at least a processor and a memory (e.g., a memory 202); computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory 202 may include static RAM, dynamic RAM, flash memory, one or more flip-flops, ROM, CD-ROM, disk, tape, magnetic, optical, or other computer storage medium. The input device(s) may include a keyboard, mouse, touch screen 106A, light pen, tablet, microphone, sensor, or other hardware with accompanying firmware and/or software. The output device(s) may include a monitor or other display, touch screen 106A, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the disclosed embodiments is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components (e.g., a connector detector 204, a shape detector 206, a shape modifier 208, an intent detector 209, a connector modifier 210, etc.). As used herein, a software module or component may include any type of computer instruction or computer executable code stored by a memory device (e.g., the memory 202). A software module may, for instance, include one or more physical or logical blocks of computer instructions, which may be organized as a routine, program, object, component, data structure, etc., that perform one or more tasks or implement particular data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the disclosed embodiments is already available, such as: general-purpose computers; computer programming tools and techniques; computer networks and networking technologies; digital storage media; authentication; access control; and other security tools and techniques provided by public keys, encryption, firewalls, and/or other means.

The control circuitry 200 includes a memory 202, a connector detector 204, a shape detector 206, a shape modifier 208, an intent detector 209, and a connector modifier 210. The memory 200 includes one or more electronic data storage devices (e.g., non-volatile data storage, volatile data storage, or combinations thereof), as discussed above, for example. The memory 202 is configured to store a scene graph including image elements (shapes, connectors, freehand strokes, bitmap patch boundaries, etc.) input into the touchscreen 106A by the user 108 (FIG. 1). The memory 202 is also configured to store image element models for comparison to image elements input into the touchscreen 106A by the user 108. The scene graph and image element models may be populated and queried by various subsystems. For example, the shape detector 206 may be informed of earlier shapes that have been detected. Similarly, the connector detector 204 may be informed of the shapes that have been detected in order to identify anchor points and perform connector detection. Furthermore, the shape detector 206 and connector detector 204 may compare image elements input into the touch sensor 212 to the stored image element models.

The shape detector 206 may be configured to determine geometric goodness-of-fit of image elements input into the touchscreen 106A to shape models stored in the memory 202. As used herein, the terms "shape" and "shapes" refer to regions enclosed by one or more lines. A circle, a polygon, a piecewise polynomial model, and an ellipse are all examples of shapes. Shapes may be filled or unfilled and/or may be used as part of a cut tool. For example, the shape detector 206 may be configured to detect shapes, and generate potential shape models that may correspond to the detected shapes and connectors. In some embodiments, the shape detector 206 may be configured to detect shapes in real-time while the user 108 is in the middle of adding a new stroke to an electronic document, or when the user 108 has completed a stroke.

In some embodiments, the shape detector 206 is configured to produce a plurality of different proposed shape models for comparison (e.g., in a statistical sense) to an image element that has been, or is in process of being, input by the user 108 (FIG. 1). By way of non-limiting example, the shape detector 206 may use geometric information (e.g., corners, lines, angles, etc.) to propose a series of statistics used to assemble a collection of likely models. In some embodiments, the shape detector 206 is configured to compare an image element to a plurality of shape models stored in the memory 202. The shape detector 206 may then make a determination of one of the plurality of different proposed shape models to substitute for the image element. In some embodiments, the determination may also be based, at least in part, on intent information determined by the intent detector 209. As a specific, non-limiting example, the shape detector 206 may use the intent information in choosing to offer more or less freedom in selecting from the proposed shape models. Also, very fast and undeliberate stroke data might cause the shape detector 206 to only use a limited number of potential shape models such as those corresponding to circles, squares, triangles, etc., but not use shape models corresponding to ellipses or less-common polygons.

In some embodiments, several shape models may be compared to an image element input by the user 108 by identifying lines, corners, symmetry, other geometric markers, or combinations thereof having different sizes and/or scales. Goodness-of-fit measures may be used to determine how much error is present between the image element and each shape model. By way of non-limiting example, a Sobolev-type metric may be used for computing errors when performing shape matching, and a wavelet-like analysis may be used for detecting corners at a plurality of scales. Intent information from the intent detector 209 may be used to determine how much the image element should be modified (e.g., how much error is allowable between the image element and the shape models). For example, if the image element input by the user 108 is sloppy, the shape detector 206 may be more likely to determine that two lines should be parallel to each other. The intent information may then be used to determine how the shape models should be assembled into a final output image element.

The connector detector 204 may be configured to operate similarly to the shape detector 206 except that the connector detector 204 may be configured to detect connectors (e.g., in real-time during input strokes and/or after input strokes are finished). As used herein, the terms "connector" and "connectors" refer to open polygonal lines or curves that connect shapes. Connectors may be rendered with arrow heads to communicate flow to the viewer of a diagram flow or order. In some embodiments, the connector detector 204 may determine that input strokes that connect one or more closed shapes to each other are connectors. The connector detector 204 may be configured to compare image elements input by the user 108 (FIG. 1) to connector models generated by the connector detector 204 and/or stored in the memory 202, and select a connector model to replace the image element.

Similar to the shape detector 206, the connector detector 204 may use a number of geometric and timing statistics to generate a plurality of proposed connector models. In this context the connector models may include polygonal lines, thin lines, arcs, arrows, and/or the like. As is the case for the shape detector 206, the connector detector 204 may also use the intent information to alter which potential models are considered. For example, very undeliberate (e.g., very fast) strokes might cause this subsystem to only consider a line as a potential connector model, but not consider an arc or a multi-segment polyline. Geometric context also may be considered as part of the decision-making. The connector detector 204 may be informed of previously detected shapes stored in the scene graph, and their location and orientation relative to the new stroke. For example, strokes starting on the interior or near boundaries of previously detected shapes (e.g., stored in the scene graph) may be preferred for connector detection.

The intent detector 209 is configured to determine inferred intent (e.g., a deliberateness, such as deliberate, sloppy, precise drawing, etc.) to inform decisions about what to render on the scene graph. Inferred intent may be used in many ways, such as controlling how faithfully rendered image elements in the scene graph track the detected input. For example, if the user 108 (FIG. 1) draws slowly and neatly on the touchscreen 106A, it may be desired to allow the output on the scene graph to track relatively faithfully, and allow a large vocabulary of shapes to be recognized. As another example, if the user 108 draws quickly and sloppily, it may be desirable to apply a large amount of correction and limit the shape detector 206 to detecting relatively simple shapes (e.g., rectangles, circles, triangles, etc.) or limit a subtype of shapes within a category (e.g., perhaps only right or isosceles triangles would be allowed when there is no perceived intent to draw a less-common type of triangle) to ensure that the output is aesthetically pleasing. The intent detector 209 may be configured to use statistical methods to understand both stroke geometry (straightness, curvature, etc.) of detected strokes of input on the touchscreen 106A as well as how the user 108 drew (slowly, quickly, cleanly, etc.) in order to work with the shape detector 206 and/or the connector detector 204 to make decisions regarding what the user 108 intended to draw.

Accordingly, in some embodiments, determining a degree of deliberateness may include combining a set of properties from data derived from touch inputs detected by the touch sensor 212, the set of properties including determining a speed with which input hand-drawn strokes are made by a user 108 (FIG. 1) of the computing device 100A, the level of accuracy of the shapes being drawn, the way corners are articulated, as well as other factors that can be measured from the user input.

In some embodiments, the intent information may be determined by fusing data such as the speed of the user 108 (FIG. 1) in completing a stroke, statistical models of accuracy and goodness-of-fit, and/or the like. The intent determination may be used to make rendering and interaction decisions in the subsystems discussed of the control circuitry 200 discussed herein. By way of non-limiting example, slow-and-accurate drawing may result in the greatest allowable precision. Natural, rhythmic motion may result in some dynamic limitations on the available shape and connector vocabulary based on the perceived accuracy in the drawing. Very fast, sloppy drawing may allow the control circuitry 200 to produce task-specific interpretations of the input, based on prior knowledge of the problem space and a loose statistical interpretation of the motion of the user 108. The intent information may also be determined in part by the intent information determined from previous user inputs. For example, if it is determined that the user 108 was writing text a short time ago, it may be assumed that the user 108 is continuing to write text (e.g., unless a predetermined time between user inputs passes).

The behavior of different tools, e.g., a diagramming tool, a fill tool, a cut tool, etc., may be tuned differently according to user behavior, as directed by the intent information from the intent detector 209.

The shape modifier 208 may be configured to improve aesthetics of shapes detected by the shape detector 206. The shape modifier 208 may be configured to provide shape suggestions and/or corrections to the shapes (e.g., in real-time, after the user 108 has finished drawing a particular image element or stroke, etc.) identified by the shape detector 206. For example, if the shape detector 206 selects a most likely shape model to replace an image element input by the user 108, the shape modifier 208 may be configured to perform corrections to the most likely shape model (e.g., for aesthetic purposes). By way of non-limiting example, the corrections may include symmetry correction, repetition correction, co-linearity correction, orientation correction, other corrections, or combinations thereof. As a specific, non-limiting example, the shape modifier 208 may perform orientation correction for shape boundaries and may bias shapes towards vertical and horizontal orientations.

Figure 3A:
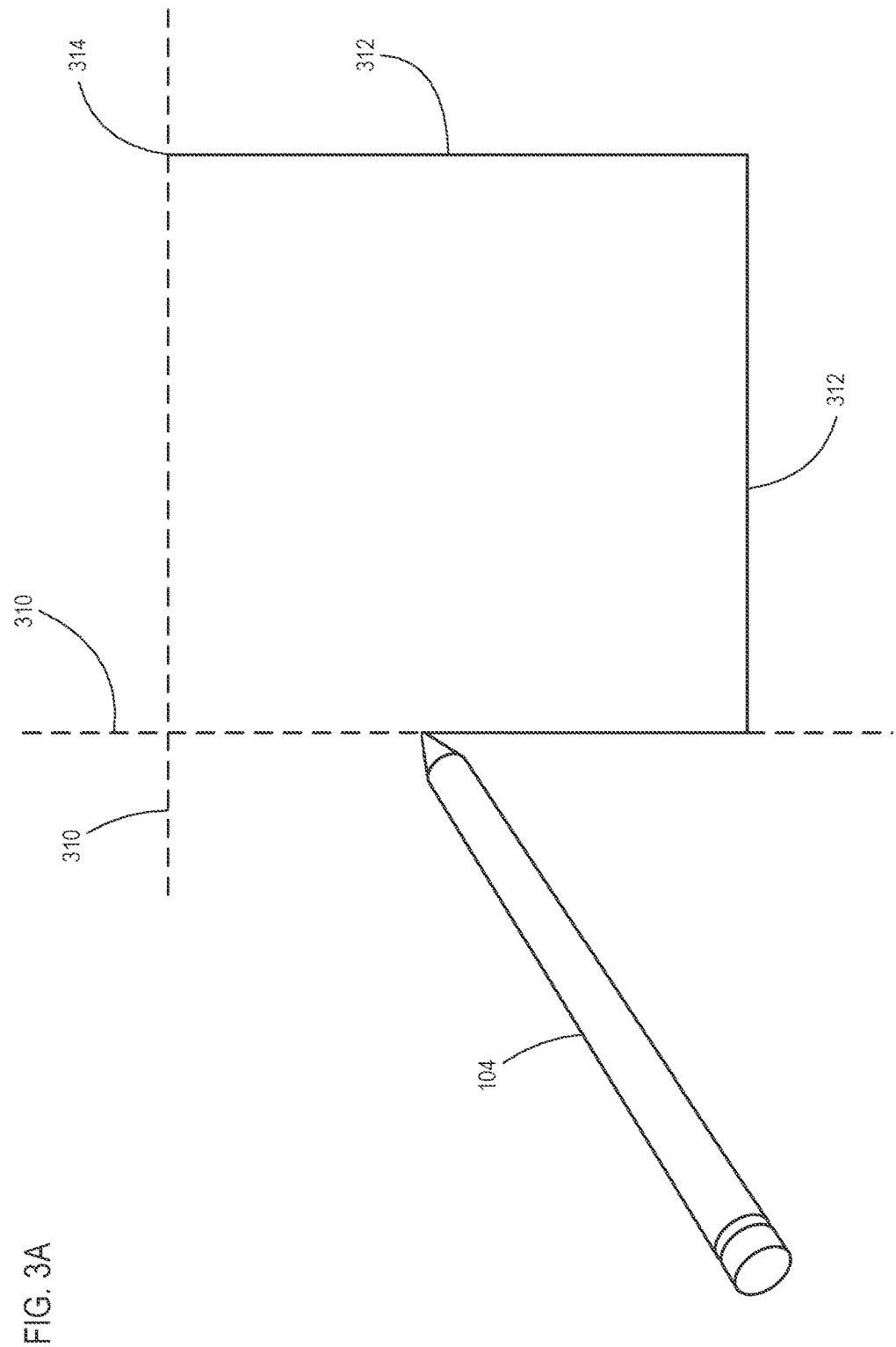
FIG. 3A is a simplified view illustrating guidelines provided as a shape suggestion by a shape modifier of the computing device of FIG. 2.

The shape suggestions made by the shape modifier 208 may be displayed on the display 214. In some embodiments, the shape suggestions may be displayed in a different color and/or shade and or form (e.g., dotted line, dashed line, etc.) than lines of the image element input by the user 108 to indicate the shape suggestion (e.g., translucent blue for suggestions and solid black for the object actually drawn). The shape suggestions may act as an "autocomplete" for shapes, lines, and/or the like. For example, the system may depict guidelines to help the user 108 aim at various onscreen targets and guide their line direction. The guidelines may be selected based on symmetry rules/constraints and/or based on a detection that the user 108 is currently drawing a line. Also, the shape modifier 208 may use suggestion lines to communicate and assist the user 108 in drawing certain shapes. As a specific, non-limiting example, if the shape detector 206 determines that the user 108 is drawing a diamond, a diamond may appear to help the user 108 complete the shape (e.g., blue translucent lines that guide the user 108 in drawing the diamond may appear) (see FIG. 3B). FIGS. 3A and 3B are examples of screenshots including such shape suggestions that may be displayed on the display 214 responsive to certain input strokes detected by the touch sensor 212.

FIG. 3A is a simplified view illustrating guidelines 310 provided as a shape suggestion by the shape modifier 208 of FIG. 2, which may be displayed on the display 214 of FIG. 2. Referring to FIGS. 2 and 3A together, the user 108 (FIG. 1) may begin drawing (e.g., with a stylus 104) an image element 312 on the touchscreen 106A starting at a point 314. As the image element 312 is drawn, the shape detector 206 may determine a most likely shape (e.g., in this case for completing a rectangle shape). The shape modifier 208 may provide a shape suggestion in the form of guidelines 310 that the user 108 may follow to complete the most likely shape detected by the shape detector 206. In some embodiments, these guidelines 310 may be illustrated in a different color (e.g., translucent blue) and/or form (e.g., a dotted line, dashed line, etc.) than the image element 312. The user 108 may then trace along the guidelines 310 to complete the image element, if desired.

FIG. 3B is a simplified view illustrating suggestion lines 320 provided as a shape suggestion by the shape modifier 208 of FIG. 2, which may be displayed on the display 214 of FIG. 2. Referring to FIGS. 2 and 3B together, the user 108 (FIG. 1) may begin drawing (e.g., with a stylus 104) an image element 322 on the touchscreen 106A starting at a point 324. As the image element 322 is drawn, the shape detector 206 may determine a most likely shape, and the shape modifier 208 may provide a shape suggestion in the form of suggestion lines 320 (e.g., in this case for completing a diamond shape) that the user 108 may follow to complete the most likely shape detected by the shape detector 206. In some embodiments, these suggestion lines 320 may be illustrated in a different color (e.g., translucent blue), and/or form (e.g., dotted line, dashed line, etc.) than the image element 322. The user 108 may then trace along the suggestion lines 320 to complete the image element, if desired.

Referring once again to FIG. 2, the corrections to the shapes identified by the shape detector 206 may vary in their application based, at least in part, on the intent information detected by the intent detector 209. The shape modifier 208 may be configured to perform orientation correction and may use intent information from the intent detector 209 to modulate how much orientation correction to apply. The shape modifier 208 also may apply organic shape correction by computing various offsets based on the original stroke input and applying them to the shape model selected by the shape detector 206. The offsets may allow shapes to be rendered in a more organic style and still retain some of the character of the original input stroke.

The corrected shape may be rendered to a graphics subsystem (not shown). Organic straightening may be accomplished by computing displacements from the detected shape, and applying damped versions of those normal displacements to the detected shape. The shape modifier 208 may show guides and other visual affordances to the user 108 during shape creation. The shape modifier 208 may also look at previously rendered shapes stored in the scene graph and reuse them for aesthetic purposes (e.g., use similarly shaped and sized rectangles within a single block diagram).

In some embodiments, the shape modifier 208 may render shapes in an organic ink-link aesthetic. By way of non-limiting example, the shape modifier 208 may mimic the behavior of a real pen, for example, by drawing thinner lines when the pen moves quickly and drawing thicker lines when it moves slowly, rounds corners, etc. Also, the shape correction may vary in a smooth manner between the user's original image element input to the touchscreen 106A and the idealized inferred shape selected by the shape detector 206 based, in part, on positional and speed information. The shape modifier 208 may also apply organic straightening by applying offsets from the user's original stroke to the idealized model detected in the shape detection phase. The shape modifier 208 may reduce the error between the inferred shape and the actual user input, but it may not entirely eliminate the error. By deliberately making the aesthetic less than perfect, small errors in shape alignment and size become less perceptible. Thus, the user 108 may be less likely to want to pause and correct image elements. Accordingly, the user 108 can create diagrams and drawings more rapidly.

Figure 3C:
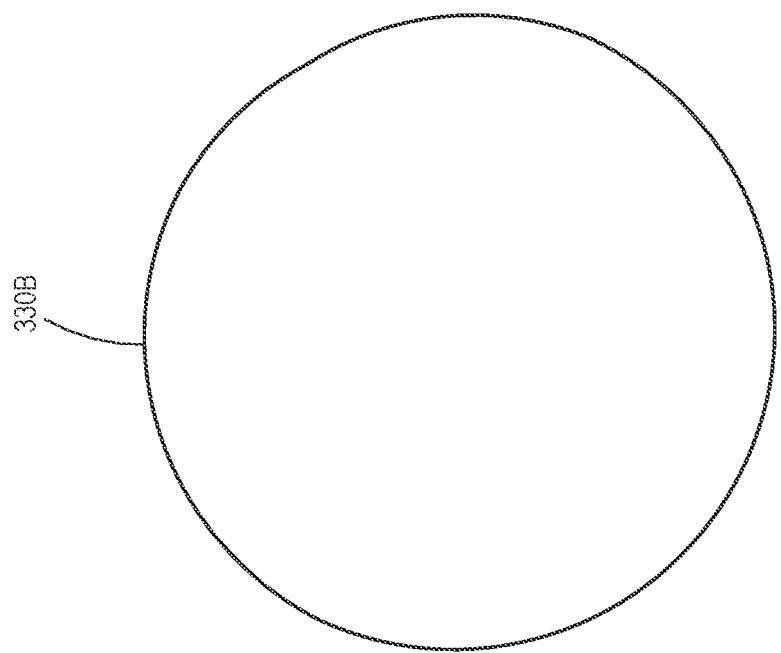
FIG. 3C is a simplified view illustrating an image element and a corresponding corrected shape generated by the shape modifier of the computing device of FIG. 2.
Figure 3C:
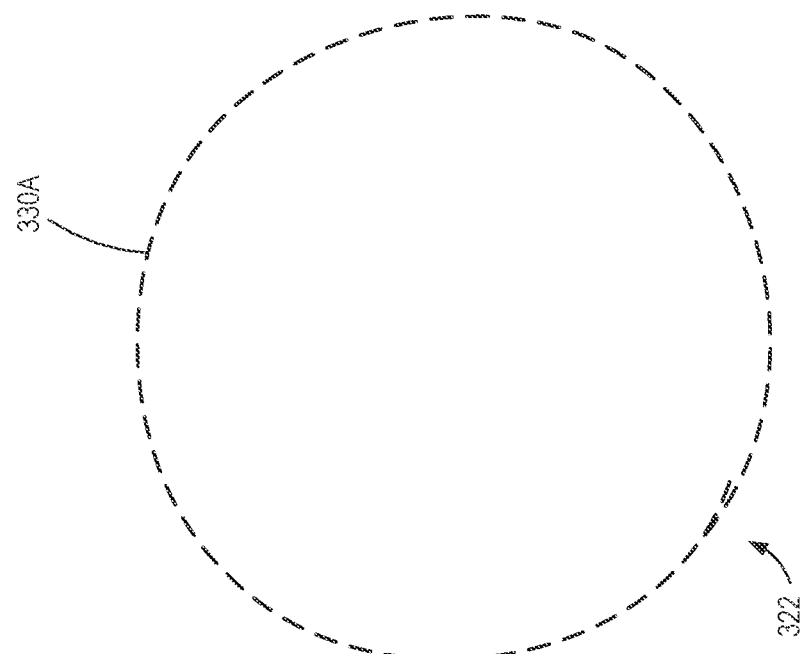
Figure 3D:
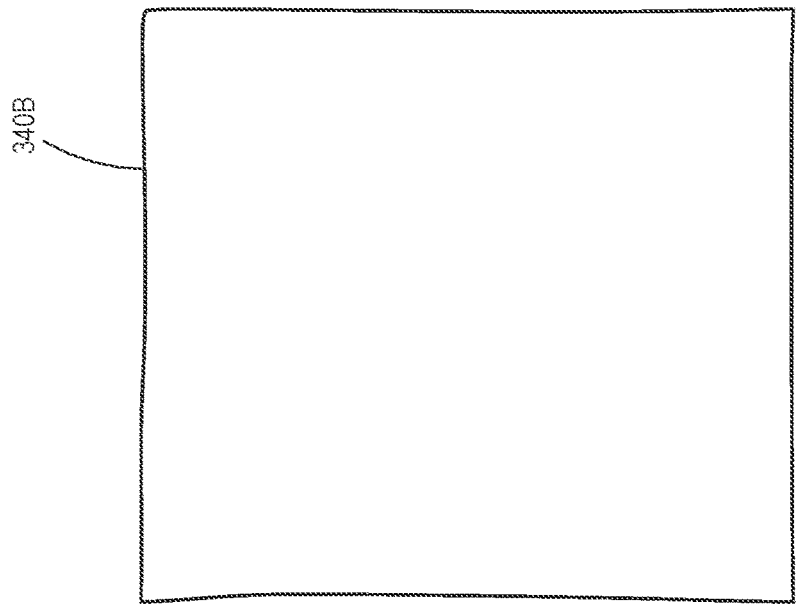
FIG. 3D is another simplified view illustrating an image element and a corresponding corrected shape generated by the shape modifier of the computing device of FIG. 2.
Figure 3D:
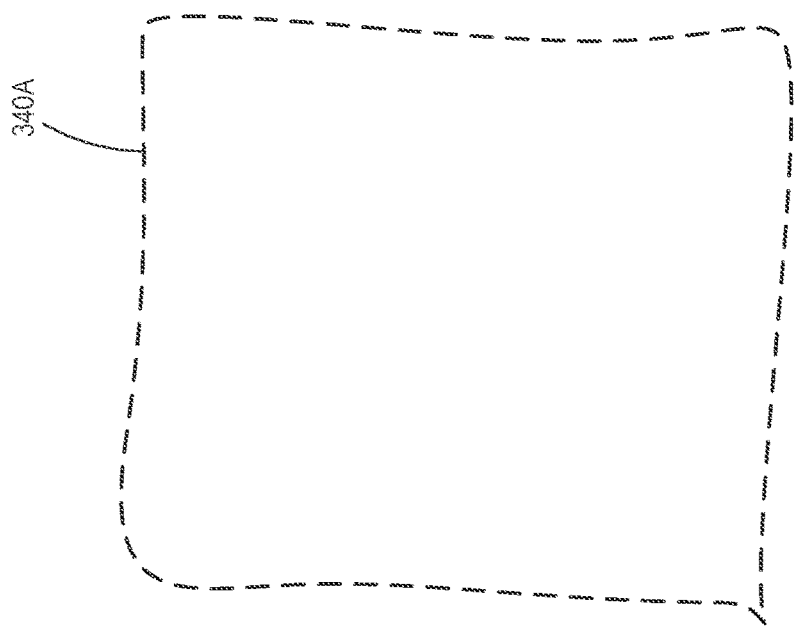

FIGS. 3C and 3D illustrate some specific simple examples of the shape modifier 208 generating corrected shapes. FIG. 3C is a simplified view illustrating an image element 330A and a corresponding corrected shape 330B generated by the shape modifier 208 of FIG. 2, which may be displayed on the display 214 of FIG. 2. Referring to FIGS. 2 and 3C together, the image element 330A includes flaws. Specifically, the image element 330A includes a line overlap 322. The shape modifier 208 may generate the corrected shape 330B without the line overlap 322. Other possible flaws that could be corrected by the shape modifier 208 may include gaps, misaligned ends of lines that should be connected together, and other flaws.

FIG. 3D is another simplified view illustrating an image element 340A and a corresponding corrected shape 340B generated by the shape modifier 208 of FIG. 2, which may be displayed on the display 214 of FIG. 2. As will be seen by inspection of FIG. 3D, the image element 340A appears to be a hand-drawn rectangle with corners having varying degrees of different curved radii. In this example, the shape modifier 208 replaced the image element 340A with the corrected shape 340B, which is a sharper version of the image element 340A inputted to the touchscreen 106A by the user 108. For example, the lines of the corrected shape 340B are straighter than the lines of the image element 340A. Also, the corners of the corrected shape 340B form sharper and more uniform points than the image element 340A. It will be noted, however, that in this example the corrected shape 340B preserves some of the imperfections of the image element 340A as compared to a perfect rectangle. It should also be noted, however, that in some instances it may be desirable to replace image elements with perfect shapes (e.g., perfect rectangles). Such preferences may be modified using settings menus provided on the display 214 by the control circuitry 200.

The connector modifier 210 may be configured to improve aesthetics of connectors detected by the connector detector 204. In some embodiments, the connectors (like shapes) may be rendered with an organic ink-link aesthetic. As with shapes, the aesthetic may also be less than perfect, in some embodiments, so that small errors are less noticeable. This aesthetic improvement of connectors may be provided in real-time during drawing of image elements, after completion of drawing of image elements, or combinations thereof. In some embodiments, very fast movements may result in correction after the user 108 ends a stroke, but slower movements may result in real-time correction. In this context the connector modifier 210 may display guidelines (e.g., using lines of a different color, shade, and/or form) on the display 214 to indicate which model the connector modifier 210 is inferring, and to provide transparency in the user interface (UI) and a mental model for the user 108 of what the connector modifier 210 is suggesting.

Figure 4A:
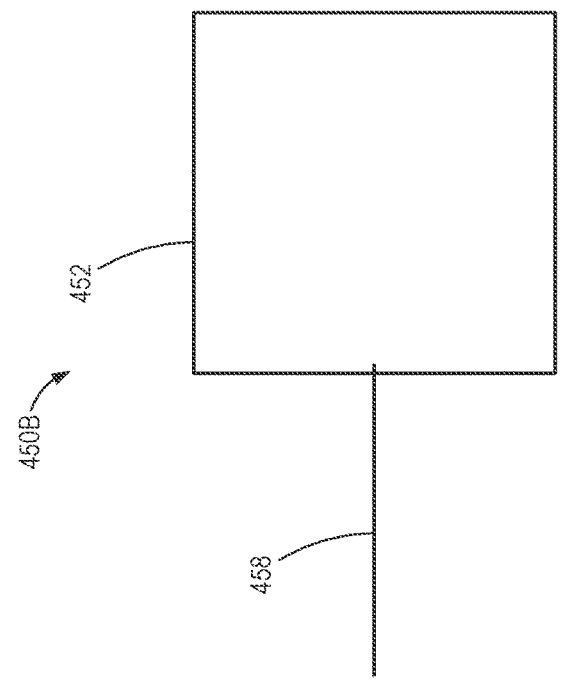
FIG. 4A is a simplified view illustrating a first instance and a second instance involving a shape and a corrected connector, according to some embodiments.
Figure 4A:
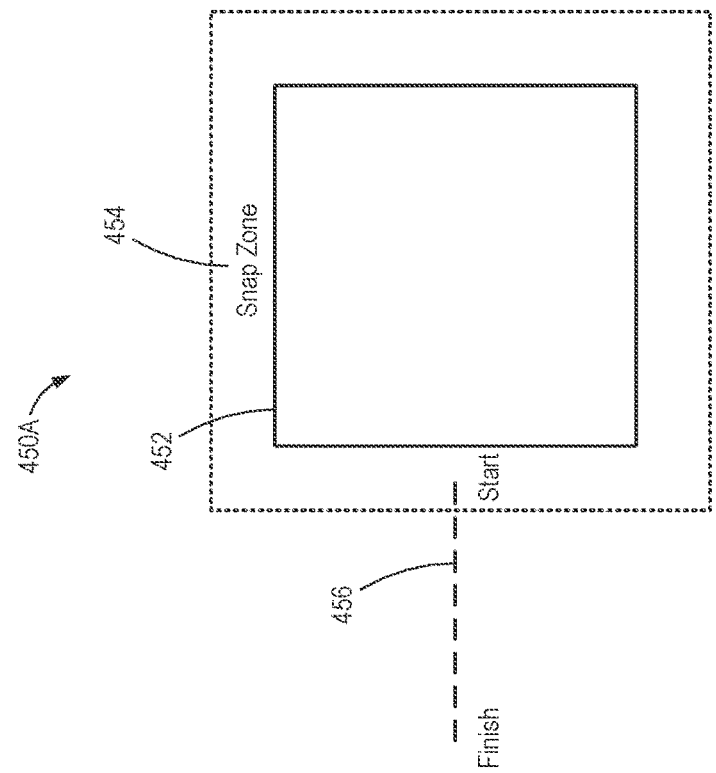
Figure 4B:
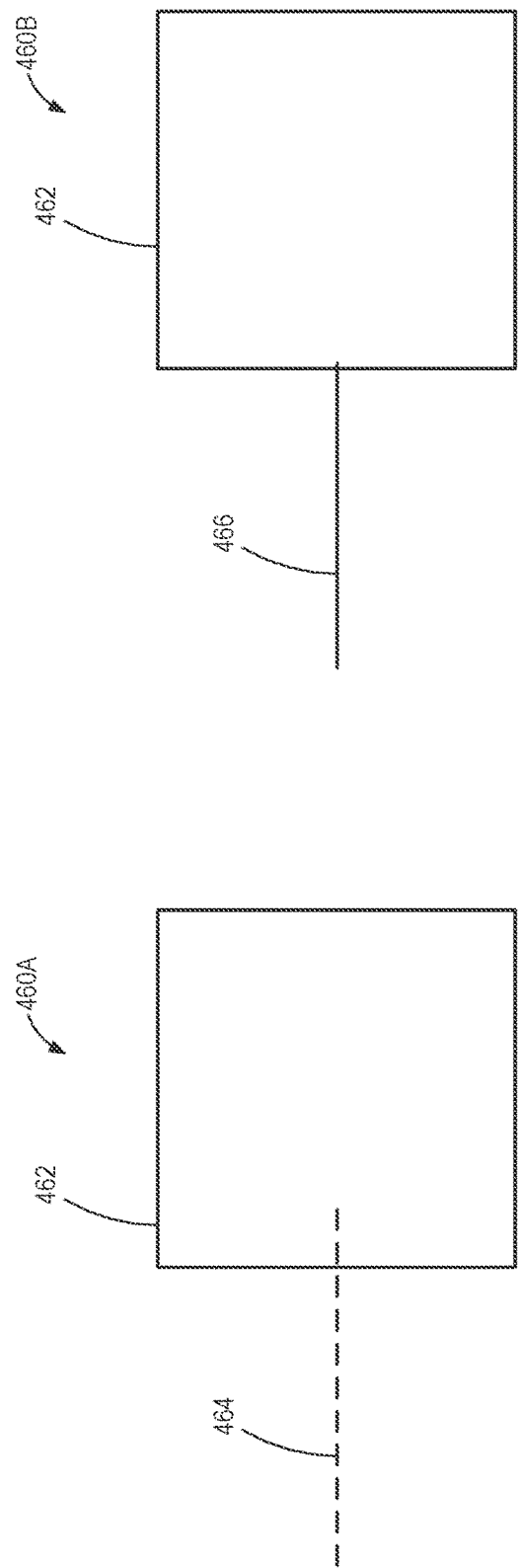
FIG. 4B is another simplified view illustrating a first instance and a second instance involving a shape and a corrected connector, according to some embodiments.

In some embodiments, the connector modifier 210 may perform straightening of detected connectors and aligning of detected connector endpoints to anchors of shapes (e.g., aesthetically pleasing anchors on shapes, such as edge midpoints and corners of shapes). In some embodiments, the connector modifier 210 may clean up connectors using shape boundary information from the shape detector 206, the shape modifier 208, or combinations thereof (e.g., to enable the connector endpoints to be located at or near shape boundaries of shapes connected by the detected connectors). FIGS. 4A and 4B illustrate examples of such corrections.

FIG. 4A is a simplified view illustrating a first instance 450A and a second instance 450B involving a shape 452 and a corrected connector 458, which may be displayed on the display 214 of FIG. 2. Referring to FIGS. 2 and 4A together, in the first instance 450A, an image element 456 in the form of a line having a start endpoint within a snap zone 454 (e.g., an area extending outside of the shape 452 in which an endpoint of a potential connector may be corrected to be located relatively closely to the outside border of the shape 452) of the shape 452 is drawn. The start endpoint of the image element 456 is relatively far from the outside boundary of the shape 452. The connector detector 204 may detect the image element 456 to be a connector, and in the second instance 450B, the corrected connector 458 (e.g., generated by the connector modifier 210) is displayed. As shown in the second instance 450B, the corrected connector 458 has been corrected to have its endpoint corresponding to the start endpoint of the image element 456 located relatively closely to the outside boarder of the shape 452. Also, the connector modifier 210 may use shape boundaries to extrapolate connectors that do not reach the shape boundaries towards anchor points.

FIG. 4B is another simplified view illustrating a first instance 460A and a second instance 460B involving a shape 462 and a corrected connector 466, which may be displayed on the display 214 of FIG. 2. Referring to FIGS. 2 and 4B together, in the first instance 460A, an image element 464 in the form of a line that overlaps an outside boundary of the shape 462 is drawn. As shown in the second instance 460B, the corrected connector 466 has been corrected (e.g., by the connector modifier 210) to not extend as far into the shape 462 as the image element 464. Accordingly, the connector modifier 210 may clip endpoints of connectors against shape (e.g., corrected shape) boundaries so that connectors do not appear in the interior of the shapes.

Referring again to FIG. 2, in some embodiments, the connector modifier 210 may also enable the user 108 to select an option to automatically add an arrow to one or more endpoints of a detected connector (e.g., by displaying suggested arrows at one or more endpoints of the detected connector that may be tapped to automatically add to the corrected connector). In some embodiments, the connector modifier 210 may also offer an arrow user interface (UI) allowing the user 108 to add arrow heads to detected and/or corrected connectors.

When the user 108 has finished drawing a connector, the user 108 may or may not want an arrowhead to be added to the connector. In some embodiments, the connector modifier 210 may present a tappable blue-ink (temporary) arrowhead which will commit black ink (permanent) if tapped. In some embodiments, the connector modifier 210 may use the shape boundaries to ensure arrowheads are placed on the exterior of shape boundaries.

FIG. 4C is a simplified view illustrating a corrected connector 476 connecting a shape 470 to another shape 472, which may be displayed on the display 214 of FIG. 2. Referring to FIGS. 2 and 4C together, one endpoint of the corrected connector 476 is located within a snap zone 474 of the other shape 472. Accordingly, the connector modifier 210 is configured to display an arrowhead 478 on this endpoint of the corrected connector 476. If selected, the arrowhead 478 may become a part (e.g., a permanent part) of the corrected connector 476. Accordingly, in some embodiments, before being selected, the arrowhead 478 may be displayed using a different color, shade, and or form than that of the corrected connector 476. By way of non-limiting example, the arrowhead 478 may be illustrated in translucent blue, and the corrected connector 476 may be illustrated in black.

Referring once again to FIG. 2, in various embodiments, the previously discussed components (e.g., the connector detector 204, the shape detector 206, the shape modifier 208, the intent detector 209, and the connector modifier 210) may be used separately, in subgroups, or all in conjunction, to create the visual geometry shown to the user 108 and in an in-memory graph data structure that stores the image objects and corrected image objects, and associated bitmap boundaries. The graph data structure can be used for editing scenarios like copy, paste, duplicate, adding color fills, etc.

Image elements that are not determined to be shapes or connectors may be treated as freehand strokes. Freehand strokes may be simply what the user 108 has entered into the touchscreen 106A. Freehand strokes may be rendered in a similar ink aesthetic as other diagram objects (e.g., shapes, connectors, etc.). In some embodiments, freehand strokes do not participate in selection or cut and paste beyond being treated like other bitmap content. By using a common aesthetic, users 108 of the computing device 100A may be allowed to perform handwriting tasks like labelling a box (e.g., a corrected shape), annotating content without switching to a new tool or having the system perform handwriting recognition.

It should be understood that, within the scope of the disclosure, other organizations of functional elements of the control circuitry 200 may be made. By way of non-limiting example, the shape detector 206 and the connector detector 204 may be implemented in a single functional element. Also, the shape detector 206 and the shape modifier 208 may be implemented into a single functional element. Other combinations and/or divisions of the functional elements of the control circuitry 200 are possible, and do not represent a departure from the scope disclosed herein.

Figure 5:
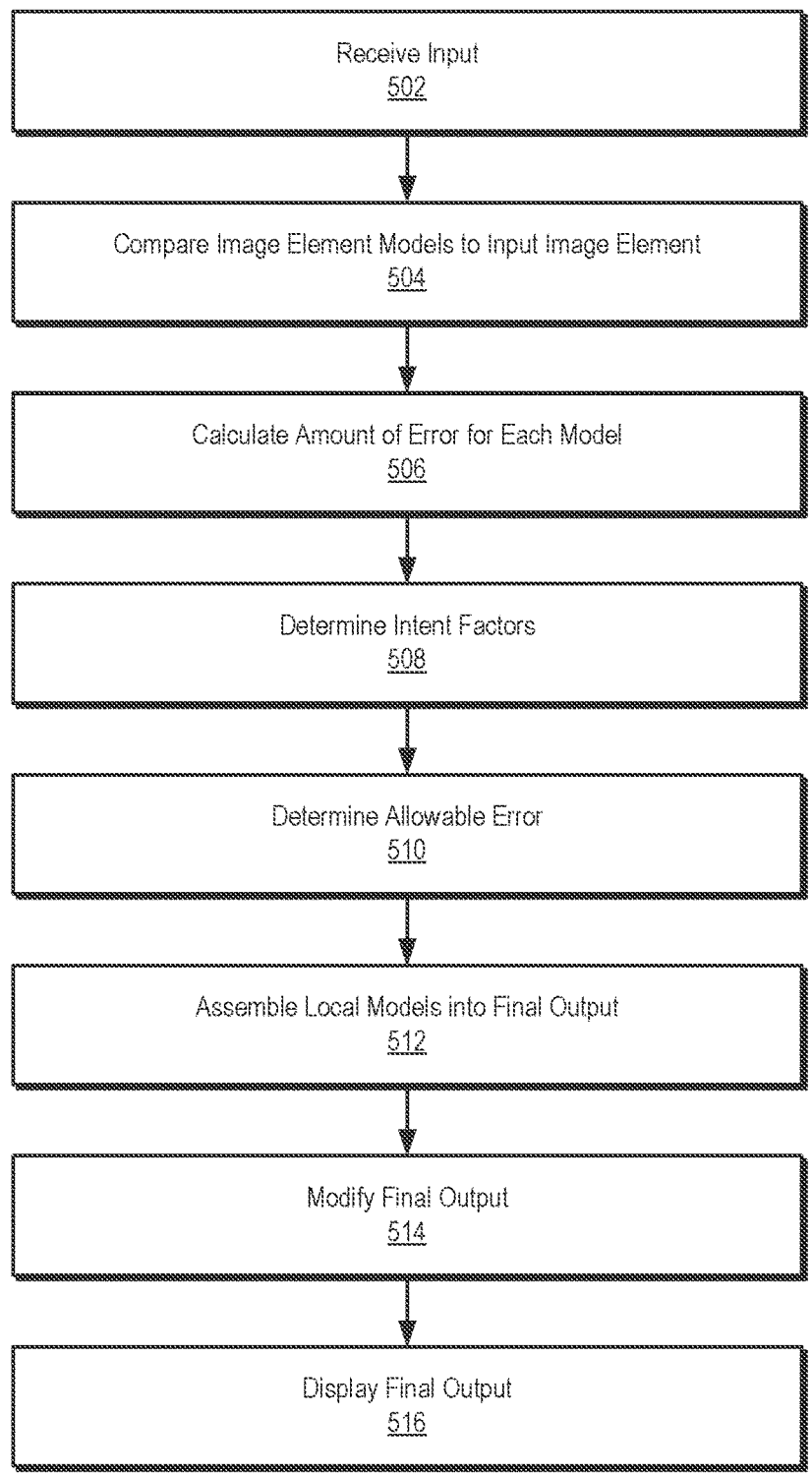
FIG. 5 is a simplified flowchart illustrating a method of correcting image elements.

FIG. 5 is a simplified flowchart illustrating a method of correcting image elements. The method includes receiving 502 an input. In some embodiments, receiving 502 an input includes receiving touch inputs with the touch sensor 212 (FIG. 2) of the touchscreen 106 (FIG. 1), 106A (FIG. 2).

The method also includes comparing 504 image element models to image elements detected from the input. In some embodiments, comparing 504 image element models to image elements detected from the input includes comparing shape models (e.g., generated by the shape detector 206 of FIG. 2, stored in the memory 202 of FIG. 2, etc.) to shapes drawn by the user 108 (FIG. 1) on the touchscreen 106, 106A. In some embodiments, comparing 504 image element models to image elements detected from the input includes comparing connector models (e.g., generated by the connector detector 204 of FIG. 2, stored in the memory 202, etc.) to connectors drawn by the user 108 on the touchscreen 106, 106A. In some embodiments, comparing 504 image element models to image elements detected from the input includes identifying geometric markers of the image elements, and comparing the identified geometric markers to geometric markers of the image element models. In some embodiments, the geometric marker includes lines, corners, symmetry, or combinations thereof.

The method further includes calculating 506 an amount of error for each image element model. In some embodiments, calculating 506 an amount of error includes determining goodness-of-fit measures representing how much error is present between the image elements and the shape models. In some embodiments, the goodness-of-fit measures include a Sobolev-type metric for computing errors when performing shape matching.

The method also includes determining 508 intent factors. In some embodiments, determining 508 intent factors includes determining a speed with which strokes of the input are made. In some embodiments, determining 508 intent factors includes determining how deliberate the inputs appear to be.

The method further includes determining 510 an allowable error between the image element models and the image elements detected from the input. In some embodiments, determining 510 the allowable error between the image element models and the image elements includes limiting differences between candidates for replacing the image elements and the image elements.

The method also includes assembling 512 local models into final output. In some embodiments, assembling 512 the local models into final output includes selecting image element models to replace the image elements. In some embodiments, selecting image element models to replace the image elements includes selecting the image element models corresponding to minimum error between the selected image element models and the image elements.

The method further includes modifying 514 the final output. In some embodiments, modifying 514 the final output includes correcting at least one of shapes and connectors. In some embodiments, correcting shapes includes correcting symmetry, repetition, co-linearity, orientation, or combinations thereof of the selected shapes. In some embodiments, correcting shapes includes providing one of guidelines and suggestion lines while receiving 502 the input. In some embodiments, correcting connectors includes moving endpoints of connectors closer to outside borders of shapes. In some embodiments, correcting connectors includes moving endpoints of connectors to anchor points of shapes. In some embodiments, correcting connectors includes displaying arrowheads at endpoints of connectors for acceptance or rejection by the user 108. The method also includes displaying 516 the final modified output on the touchscreen 106, 106A.

FIG. 6 is a chart 600 illustrating an example embodiment of vocabularies of models (e.g., shape models, connector models, freehand models, etc.) for different levels of identified deliberateness in user input, according to some embodiments. The example illustrated in FIG. 6 is illustrative only, and those of skill in the art will recognize that nearly infinite variations may be made on the vocabularies that may be used without departing from the scope of the disclosure. In the example of FIG. 6, the speed (e.g., in descending order from "super fast," to "flow fast" to "slow and deliberate") of input strokes inputted by the user 108 (FIG. 1) into the computing device 100 (FIG. 1), 100A (FIG. 2) is correlated against various options (shapes (e.g., shape models the shape detector 206 is permitted to use), lines, angle to canvas, starting angle, ink, guidelines, corner style, and rendering). As a specific non-limiting example, the shape vocabulary is relatively small (i.e., including only circles, triangles, and rectangles) if the input speed is "super fast." The shape vocabulary increases as the input speed is decreased (i.e., circles, triangles, rectangles, and more obscure trapezoids for "flow fast," and any shape for "slow and deliberate").

The chart 600 may be an illustrative form of rules by which the control circuitry 200 (FIG. 2) abides during operation. In some embodiments, the control circuitry 200 may be configured to provide menu options to modify these rules so that the user can set rules in a desired form, then generate various types of image elements on the fly without manipulating cumbersome menu options, according to the rules as modified.

Those having skill in the art will appreciate that many changes may be made to the details of the above-described embodiments without departing from the underlying principles of the disclosure. The scope of the present application should, therefore, be determined only by the following claims.

The invention claimed is:

1. A method of operating a computing device, the method comprising:
   receiving a sequence or continuum of user inputs on a touch-sensitive device at identifiable locations;
   identifying the sequence or continuum of user inputs at the identifiable locations as an image element from a hand-drawn user input;
   comparing the image element derived from the hand-drawn user input to image element models stored in one or more data storage devices;
   selecting one of the image element models to replace the image element when the selected one of the image element models matches the image element according to a set of rules stored in the one or more data storage devices;
   correcting the selected one of the image element models to improve an aesthetic appearance of the selected one of the image element models, according to the set of rules; and displaying the corrected image element model on an electronic display of the computing device,
   wherein determining a degree of deliberateness with which the hand-drawn user input is made, wherein at least one of selecting one of the image element models to replace the image element and correcting the selected one of the image element models varies, at least in part, according to the determined degree of deliberateness,
   wherein determining the degree of deliberateness comprises:
   determining a speed with which input hand-drawn strokes are made by the user of the computing device; and
   comparing an image element to image element models comprises comparing the image element to fewer image element models when faster input hand-drawn strokes are made than when slower input hand-drawn strokes are made.

2. The method of claim 1, wherein determining the degree of deliberateness comprises determining an accuracy with which input hand-drawn strokes are made by the user of the computing device.

3. The method of claim 1, wherein selecting one of the image element models to replace the image element and correcting the selected one of the image element models comprise conforming more closely to the hand-drawn user input if slower input hand-drawn strokes are made by the user, and conforming more loosely to the hand-drawn user input if faster input hand-drawn strokes are made.

4. The method of claim 1, wherein determining the degree of deliberateness further comprises determining an accuracy with which input hand-drawn strokes are made by the user of the computing device, such that the degree of deliberateness is a function of speed and accuracy.

5. The method of claim 1, wherein determining a degree of deliberateness comprises analyzing one or more properties taken from the list consisting of a speed with which input hand-drawn strokes are made by a user of the computing device, a level of accuracy with which input hand-drawn strokes are made by the user of the computing device, and a manner in which corners are articulated by the user of the computing device.

\* \* \* \* \*